United States Patent
Gartung et al.

[19]

[11] Patent Number: 5,831,211
[45] Date of Patent: Nov. 3, 1998

[54] VARIABLE-TYPE CABLE MANAGEMENT AND DISTRIBUTION SYSTEM

[75] Inventors: Clifford W. Gartung, 41576 Calle Pino, Murrieta, Calif. 92562; Brad G. Greer, Irvine, Calif.

[73] Assignee: Clifford W. Gartung, Murrieta, Calif.

[21] Appl. No.: 627,973

[22] Filed: Apr. 4, 1996

[51] Int. Cl.⁶ ................................................ H02G 3/04
[52] U.S. Cl. ........................ 174/48; 52/220.7; 439/215
[58] Field of Search ...................... 174/48, 49, 52.4, 174/53, 57; 52/220.2, 220.7, 239; 361/826, 827; 439/215

[56] References Cited

U.S. PATENT DOCUMENTS

| | | | |
|---|---|---|---|
| Re. 31,733 | 11/1984 | Haworth et al. . | |
| 4,199,206 | 4/1980 | Haworth et al. . | |
| 4,203,639 | 5/1980 | VandenHoek et al. . | |
| 4,232,183 | 11/1980 | Person | 174/48 |
| 4,277,123 | 7/1981 | Haworth et al. . | |
| 4,370,008 | 1/1983 | Haworth et al. . | |
| 4,378,727 | 4/1983 | Doss | 454/251 |
| 4,546,590 | 10/1985 | Finch et al. | 52/520 |
| 4,841,699 | 6/1989 | Wilson et al. . | |
| 4,911,510 | 3/1990 | Jenkins . | |
| 5,013,112 | 5/1991 | Hellwig . | |
| 5,024,614 | 6/1991 | Dola et al. . | |
| 5,271,585 | 12/1993 | Zetena, Jr. et al. | 248/49 |
| 5,303,320 | 4/1994 | Duffie . | |
| 5,473,994 | 12/1995 | Foley et al. | 108/50.02 |
| 5,672,845 | 9/1997 | Greenfield et al. | 174/48 |
| 5,685,113 | 11/1997 | Reuter et al. | 52/220.7 |

OTHER PUBLICATIONS

"Fundamentals of Fiber Optics", Hecht, Understanding Fiber Optics, 1987, pp. 15–33.

*Primary Examiner*—Bot L. Ledynh
*Assistant Examiner*—Dhiru R. Patel
*Attorney, Agent, or Firm*—Price, Gess & Ubell

[57] ABSTRACT

A system is provided for storing, distributing, and managing variable-type communication cables in open office environment. The system of the present invention uses a centrally located multi-user communication cable interface module, a series of cable channels with protective caps adapted to be mounted on most partition panel upper surfaces, a plurality of jumper cables routed horizontally from said communication cable interface module along said cable channels, and a plurality of routing conduits adjacent the partition panel for vertically directing the jumper cables from the cable channels to the communication cable receiving device. The present invention eliminates inconvenience and extended downtime associated with office relocations by maintaining a central connection and easily accessible, removable, and reconnectable jumper cables while providing virtually invisible cable management and distribution. The system permits management and distribution of copper, coaxial, and fiber optic communication cables simultaneously while maintaining industry standards.

32 Claims, 3 Drawing Sheets

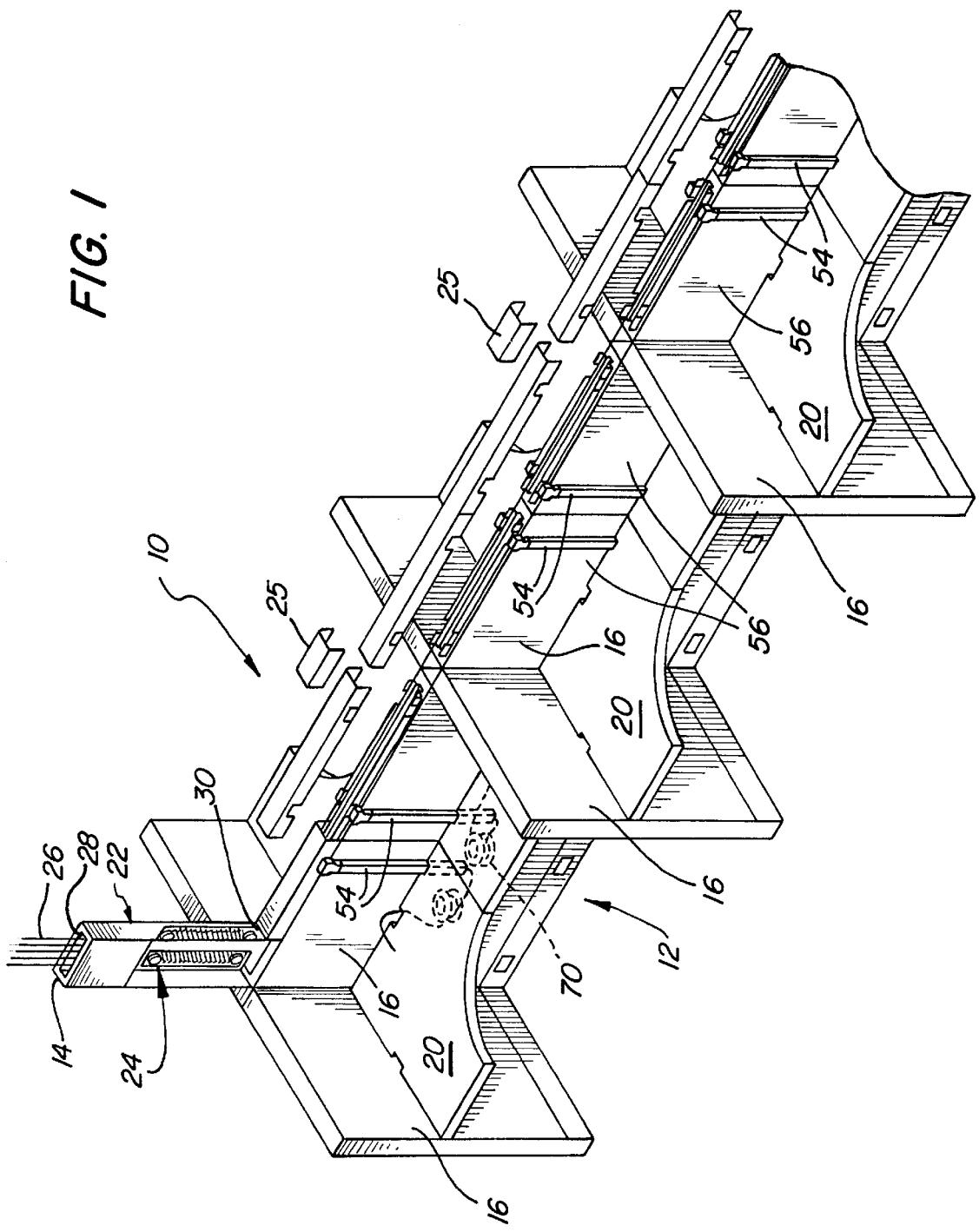

VARIABLE-TYPE CABLE MANAGEMENT AND DISTRIBUTION SYSTEM

BACKGROUND OF THE INVENTION

1. Field of the Invention

The present invention relates generally to work space management and, more specifically, to a system for managing and directing variable types of communication cable and fiber optics in an open office environment that uses modular work stations while providing central connection, distribution, testing, and verification. The system provides a user with essentially invisible communication cable management while maintaining cable accessibility and preserving the ability to move and reassemble the modular components of the work space without the need for recabling.

2. Description of Related Art

Most open office environments using a cubicle-type arrangement employ what is known as "home-run" cabling whereby a communication cable is routed from a wiring hub or closet in a bundle with other communication cables directly to a distant work station. The home-run cabling bundle is typically maintained inside partition panel raceways or outside the panels along a floorboard. Home-run cabling has the advantage of providing the most reliable form of networking because it possesses the fewest "potential points of failure." A potential point of failure is any point in the network communication cabling where a break or connection occurs in a circuit. However, the difficulties in home-run cabling are readily apparent once one considers the ramifications of moving a distant cubicle or connected communication device. The distance between a wiring hub or closet and the final connection point may be as much as 100 meters. This 100 meters of cable is typically routed behind equipment, under carpet, or in walls to keep it hidden and out of the way. Rerouting a cable from one location to another results in significant disruption of the office environment as a cable is pulled through a labyrinth of corners and turns to be rerouted through a different maze. If the communication cabling bundle is concealed inside a partition panel, moving the cubicle—as would be required during a office reorganization—requires disassembling the partition panel, removing the communication cable, moving the panels, reinstalling the communication cable in the panel, reassembling the panels, retesting the cable system, and reconnecting the cable to its recipient device. Such a system has the effect of anchoring each cubicle in place or face a major recabling project. Moreover, if another cable needs to be added to a work station, a line must be fed through the entire home-run path to the recipient device at significant expense of time and cost.

Another disadvantage of existing communication cable management systems for use in an open office environment is the lack of a universal raceway to cooperate with different partition panels. Existing raceways must either be redesigned to fit onto different partition panels or different raceways must be continuously designed. Furthermore, existing raceways lack an efficient and accessible means to route communication cables from the raceway to the end device. Another limitation of existing communication cable raceways is an adequate means to route copper communication cable while additionally providing a raceway compatible with the special requirements of fiber optic communication cable. These and other problems of the prior art have been solved by the present invention.

OBJECTS AND SUMMARY OF THE INVENTION

The present invention is directed to an improvement in communication cable management and distribution systems in a modular partitioned work place. The system utilizes a cable raceway which is designed to be mountable to most major partition panel configurations currently used in office design, and is designed to accommodate the special requirements of fiber optic cable management as well as other more common types of office communication cables. The raceway mounts atop the partition panels and provides convenient accessibility while concealing and protecting the communication cables. The system is sensitive to the special limitations of fiber optic cable by eliminating abrupt changes in the direction of the communication cable. The raceway comprises a cable channel which mounts to the top of most major partition panel configurations and a cable channel cap which mounts on the cable channel in various positions to accommodate the different partition panel configurations. The raceway is used to direct connection cables, or "jumper" cables, from a central distribution module to each work station requiring a communication cable connection. Routing conduits or "vertical cable managers," are used to route the jumper cables from the raceway to the area where the communication cable is to be connected. The vertical cable managers are secured to the face of the partition panels and extend from the raceway to below a desk, table, cabinet, or other office furniture to maintain invisible cable management.

The communication cable management system employs a multi-user communication cable interface module located near the designated work station to provide a central communication link to the cluster of work stations. By positioning a central communication link near each cluster of work stations and communicating to each work station through this central link, the problems associated with traditional home-run cabling are avoided.

The system provides the advantage of preserving the connections from a cable closet/hub to the communication cable interface module during a reorganization, and greatly reduces the effort to add another cable connection to an existing work station. To wit, if a user anticipates that future communication cable connections will be required, several additional utility cables can be connected to the cable communication module when the initial installation occurs. When the additional communication cable is then required, an appropriate jumper cable is connected to the multi-user communication cable interface module and routed into the raceway by simply removing the cable channel cap and guiding the jumper cable to its intended work station. If a vertical cable manager is in place, it is simply removed, the jumper cable is then inserted, and the vertical cable manager is replaced to position the jumper cable end to its intended device. If a vertical cable manager is not present, the user needs only to remove a break from the cable channel cap, thereby creating a path into which a vertical cable manager is inserted and, as before, the connection is made below the user working plane between the jumper cable and the intended device.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings.

FIG. 1 is a perspective view of a typical work space in which the elements of the cable management system are shown;

DETAILED DESCRIPTION OF THE PREFERRED EMBODIMENTS

Figure 4:
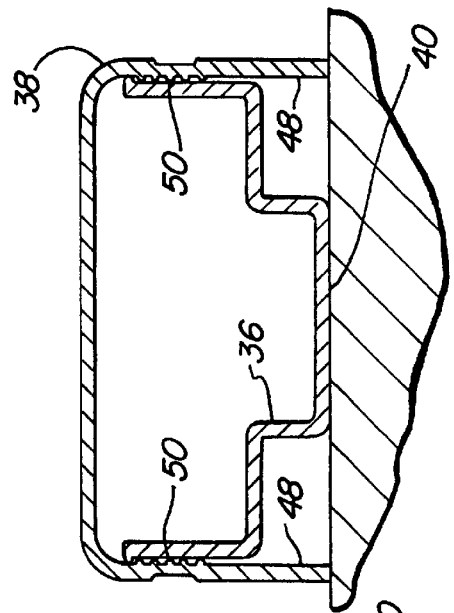
FIG. 4 is a side elevation view of the cross-section of the cable channel and cap for a third panel partition top.

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically for variable-type cable management and distribution systems.

The system generally shown at 10 of the present invention will be best understood by reference to the drawings. FIG. 1 shows several typical work stations 12 which are formed by modular partition panels 16 which are necessarily shorter than the height of the ceiling, and an abutting desktop 20. It will be understood that although the work station 12 embodied in FIG. 1 shows one type of work station, there are many commercial embodiments of desks, panels, counter tops, cabinets, and the like which are used to form a work station 12, and the particular configuration or number of each component is not critical to this invention. The system of the present invention is useful with all such configurations, and is not to be construed as being solely limited to any single type of work station configuration. Thus, the work station 12 in FIG. 1 should be considered to be merely an example and not limiting for the present invention.

The communication cable management and distribution system uses a centrally located multi-user communication cable interface module mounted on a partition panel, a series of cable channels with protective caps adapted to be mount on a partition panel upper surface, a plurality of jumper cables routed horizontally from the communication cable interface module along the cable channels, and a plurality of routing conduits adjacent the partition panel for vertically directing the jumper cables from the cable channel to a communication cable receiving device such as a computer. The present invention eliminates inconvenience and extended downtime associated with office relocations by maintaining a central connection and easily accessible, removable, and reconnectable jumper cables while providing virtually invisible cable management and distribution. The system permits management and distribution of copper, coaxial, and fiber optic communication cables simultaneously while maintaining the standards set by the Electronic Industry Association (EIA) and the Telecommunication Industry Association (TAI).

The communication cable interface module 14 comprises a housing unit 22 enclosing a patch panel 24. The housing unit 22 is adapted to be mounted in a variety of configurations, depending on the needs and arrangement of the particular office environment. For example, the housing unit 22 could mount to a wall which is centrally located to the work stations to be serviced by the communication cables. Alternately, the housing unit 22 could be mounted to the ceiling, the floor, atop a partition panel 16 (as shown in FIG. 1), or in any practical location. The patch panel 24 may be of the type such as a Holocomm System SD2000 modular passive patch panel, manufactured by Pleion Corporation of Santa Ana, Calif., or any other such patch panel which can couple fiber optic, coaxial, and copper cable simultaneously using multiple-type coupling jacks. The SD2000 provides a fiber optic and copper based patching system which can accommodate standard copper, telephone, fiber optic, and coaxial connectors. The number and type of each connector, generally shown at 18, are interchangeable to accommodate "mixed equipment" offices, and different patch panels can accommodate additional cable connections.

Figure 3:
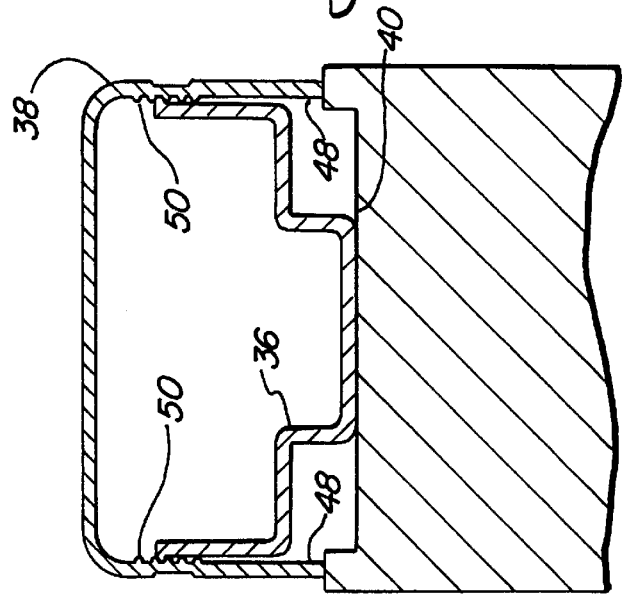
FIG. 3 is a side elevation view of the cross-section of the cable channel and cap for a second panel partition top.
Figure 2:
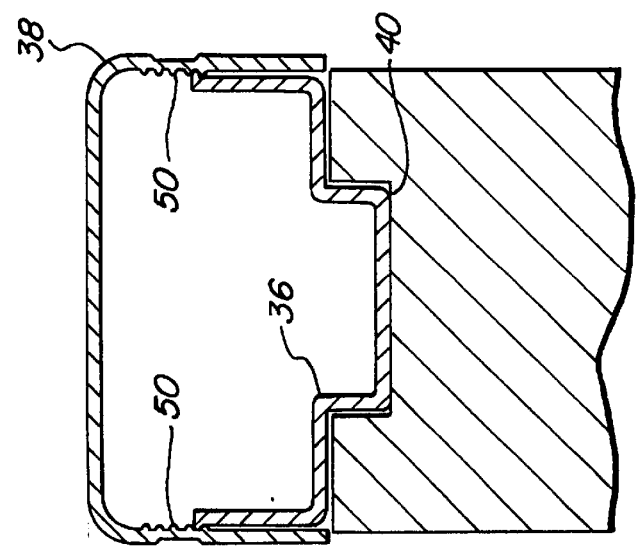
FIG. 2 is a side elevation view of the cross-section of the cable channel and cap for a first panel partition top.

The communication feeder cables 26 enter the communication module housing unit 22 at the receiving end 28 and connect to the connectors 18 on the patch panel 24. Connectors may be RJ11, RJ12, or RJ45, coaxial and fiber optic ST, FC, or SC compatible connectors, depending on the user's needs and preferences. Jumper cables 32 connect to the patch panel 24 at the connectors 18 occupied by the communication feeder cables 26 and exit through the communication module housing 22 at the departing end 30. In one preferred embodiment, the communication cable housing unit 22 as a thickness approximating the thickness of the partition panel and is mounted directly adjacent to the raceway 34. The raceway 34 is comprised of a series of connected cable channel sections shown generally as 36, and associated cable channel caps 38. The cable channel sections 36 are made of sturdy aluminum or lightweight metal and are adapted to mount to most partition panel upper surfaces. As shown in FIGS. 2–4, the cross-section of the cable channel is one of an elongated flat plate having integral walls extending therefrom in the vertical direction, the walls extending a short distance before extending laterally outward and then extending vertically again. The shape of the cable channel 36 permits the cable channel to mount directly onto three of the most popular partition panel upper surface configurations, as shown in FIGS. 2–4. This feature eliminates the need for individual cable channel shapes for most of the current partition panels in use. It should be noted that the channel walls may be continuous as shown in FIG. 1, or they may be segmented to save material.

The cable channel 36 is mounted to a partition panel 16 along its upper surface 40 using commercially practical means such as fasteners 21. The length of the cable channel 36 is less than the length of the partition panel 16, which are of standard lengths, to allow for the gradual change in direction warranted in the use of fiber optic cabling. Each channel section can be joined with or without a splicer section 25, and channel sections may also be curved to accommodate cubicles having rounded walls. Because a fiber optic cable cannot sustain its signal through an abrupt change in direction, all connections in the system, from the patch panel to the communication cable receiving device, must account for this limitation. When a fiber optic jumper cable is required to change directions perpendicularly, the distance between the end of the cable channel and the end of the partition panel permits the jumper cable 32 to gradually curve around the change in direction, thereby preserving the fiber optic signal.

The cable channel cap 38 is provided for covering the cable channel 36 and for protecting and concealing the jumper cables 32 therein. The cable channel cap 38 cooperates with the cable channel 36 by fitting over the channel such that the sides of the cable channel cap 38 press against the outer walls of the cable channel 36 to secure the cable channel cap 38 thereon. The cable channel cap 38 is approximately the same length as the cable channel and will typically completely enclose the cable channel 36 and abut the top 40 of the partition panel 16 (see FIGS. 2–4).

Figure 5:
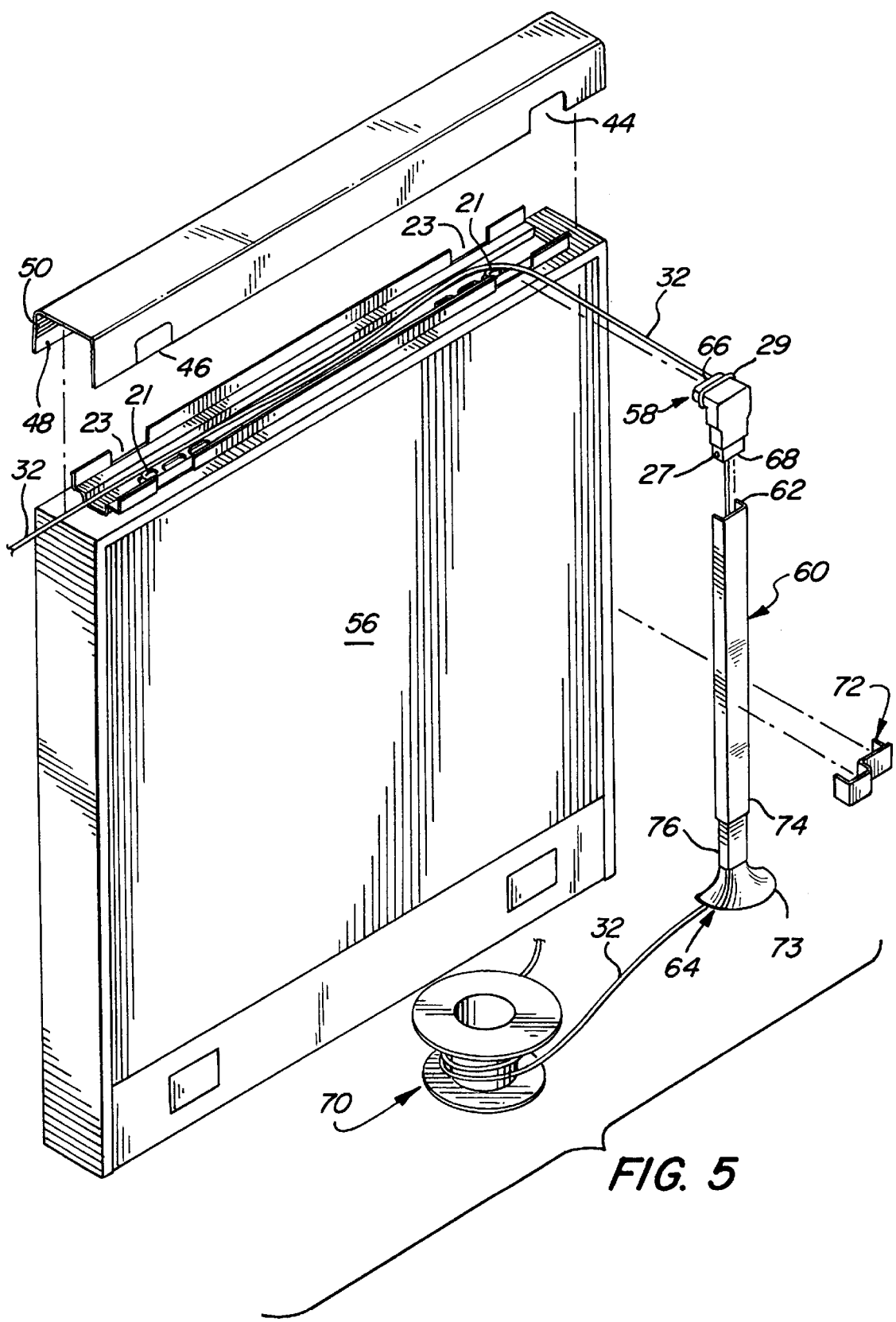
FIG. 5 is a perspective view of the vertical cable manager and cooperating raceway attached to a typical partition panel.

The cable channel cap 38 comprises snap-out plates 46 to create an exit 44 from said raceway 34 for the jumper cable 32. In one embodiment of the present invention, each cable channel cap 38 has four snap-out plates 46, shown generally in FIG. 5, to allow the user to create jumper cable exits 44 where needed along the raceway 34. The snap-out plates 46 would typically be located along each side of the cable channel 36 at opposite ends. The snap-out plates 46 are further located to coincide with slots or recesses 23 in the cable channel 36 to create an exit 44 for the jumper cables 16. The cable channel cap 38 is generally made of a sturdy but lightweight metal such as aluminum which can be machined to form grooved teeth 50 on the interior side surfaces 48. The grooved teeth 50 permit the cable channel cap 38 to secure to the cable channel 36 at different positions (see FIGS. 2–4). The addition of grooved teeth 50 to the cable channel cap 38 creates a universal cap adaptable to different partition panels 16. This is accomplished because the grooved teeth 50 engage the sides of the cable channel at variable heights to allow different-sized panel widths to be mated with the cable channel cap 38 (see FIGS. 2–4).

The cable channel 36 has an intermediate U-shape configuration 35 with integral L-shape flanges 37 on either side. The top outer edge of each flange 37 includes rim member 39 to engage the grooved teeth 50 of the cable channel cap 38.

The jumper cable 32 exits the raceway 34 and enters a vertical cable manger or routing conduit 54 which is secured along the face 56 of a partition panel 16 by a clamp mechanism 72. The vertical cable manager 54 is comprised of a upper shroud member 58 and an elongated semitube 60 which are connected to each other to maintain a enclosed pathway for the jumper cable 32. The upper shroud member 58 is a formed elbow which has a first end 66 which is inserted into the jumper cable exit 44 in the raceway 34 formed by the removal of the cable channel cap snap-out plates 46. The upper shroud member 58 has a raised band 29 which fits into the jumper cable exit 44 to secure the shroud member 58 in the jumper cable exit 44, but numerous means of removably securing the shroud member into the jumper cable exit can be envisioned which provide for easy access to the jumper cable.

The vertical cable manager further comprises a semitube 60 connected to the upper shroud member 58 at the outlet end 68. Retaining bumps 27 on the upper shroud member 58 secure the upper shroud member to the semitube 60. The semitube receives the jumper cable 32 and encloses the jumper cable 32 between the interior of the semitube 60 and the abutting partition panel face 56. The jumper cable 32 exits the raceway 34 through a jumper cable exit 44, enters the upper shroud member 58, and then enters the semitube's entrance 62 and exits out the opposite end 64. The semitube 60 will preferably extend below a user working plane such as a desk or table so that no cables are visible. In a preferred embodiment, a take-up spool 70 is placed below the user working plane to collect any slack of the jumper cable 32 once the jumper cable exits the semitube 60. The take-up spool 70 must conform to the requirements for Category 5 copper and fiber optic cables to maintain performance standards. This is achieved by using a spool 70 with the proper diameter to fulfill this requirement. The jumper cable 32 then connects to its communication cable receiving designated end device such as a computer 17.

In another preferred embodiment, the semitube 60 is comprised of two members, a smaller U-shaped member 76 fitted inside a larger U-shaped member 74. The smaller U-shaped member 76 slides within the larger U-shaped member 74, thereby extending the length or "telescopes" the vertical cable manager 54. The telescoping of the two U-shaped members allows a single vertical cable manager 54 to accommodate variably sized partition panels 16 and user work space heights without the need for multiple-sized vertical cable managers.

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than as specifically described herein.

What is claimed is:

1. A variable-type communication cable management and distribution system for use in a modular partitioned workplace comprising:

a plurality of partition panels defining an office work area and having a height less than the height of the ceiling of the office;

a plurality of communication cables;

a plurality of jumper cables having first and second ends;

a multi-user communication cable interface module having means for coupling said plurality of communication cables to the first ends of said jumper cables;

a plurality of cable channels mounted atop said plurality of partition panels and spaced from said communication cable interface module, said cable channels to receive a length of said jumper cables therein;

a plurality of removable cable channel caps each cooperating with one of said plurality of cable channels to enclose said length of said jumper cables there between; and a routing conduit adjacent to one of said plurality of partition panels having first and second ends, said first end of said routing conduit is connected to one of said cable channels, at least one of said jumper cables extends from said cable channel into the first end of said routing conduit and exits therefrom at said second end of said routing conduit, said routing conduit adapted to route jumper cable through a perpendicular change of direction without loss of operability of said jumper cable.

2. A cable management system as recited in claim 1 further comprising means for collecting excess jumper cable length spaced from the second end of said routing conduit.

3. A cable management system as recited in claim 2 wherein said means for collecting excess jumper cable comprises a take-up spool, said take-up spool collecting a length of excess jumper cable thereabout, said take-up spool adapted for collection of either a copper jumper cable or a fiber optic jumper cable while maintaining communication cable operability.

4. A cable management system as recited in claim 3 wherein said take-up spool is mounted adjacent said partition panels.

5. A cable management system as recited in claim 4 wherein said take-up spool is mounted to a lower surface of a user working plane.

6. The cable management system as recited in claim 1 wherein said routing conduit telescopes to varying lengths to extend said second end of said routing conduit below a user working plane.

7. A cable management system as recited in claim 1 wherein said plurality of communication cables includes both fiber optic and copper communication cables.

8. A cable management system as recited in claim 1 comprising a plurality of routing conduits adjacent to said plurality of partition panels and having first and second ends, each of said plurality of jumper cables extending from one of said cable channels into the first end of one of said plurality of routing conduits and exiting therefrom at said one second end of said routing conduit.

9. A cable raceway for housing cables in a modular partitioned workplace comprising:

a plurality of partition panels defining an office work area and having a height less than the ceiling of the office, said partition panels each having an upper surface and a first wall face;

a plurality of cable channels having a width less than the width of said partition panels, each cable channel mounted on top of one of said plurality of partition panels, said cable channels adapted to mate with the upper surface of said partition panels;

a plurality of cable channel caps each adapted to cover one of said plurality of cable channels, said cable channel caps comprising an upper lid and a means for securing said lid to one of said plurality of cable channels; and a plurality of routing conduits adjacent to and exterior to said plurality of partition panels, each of said routing conduits having first and second ends, said first end of one said routing conduits adapted to join said one of said cable channels with one of said plurality of routing conduits while redirecting a cable through a perpendicular change of direction without loss of operability of said cable.

10. A cable raceway as recited in claim 9 wherein said upper surface of said plurality of partition panels include a recessed groove along the length of the upper surface, said plurality of cable channels each having a bottom surface adapted to mate with said recessed groove in a mounting relationship.

11. A cable raceway as recited in claim 10 wherein said plurality of cable channels are further adapted to mount on one of said partition panels having a generally flat upper surface.

12. A cable raceway as recited in claim 11 wherein said means for securing said lid to one of said cable channels comprises a pair of side walls extending from said lid, said side walls of said lid engaging one of said cable channels to secure said lid thereon.

13. A cable raceway as recited in claim 12 further comprising a plurality of grooved teeth on said side walls which engage one of said cable channels to secure said lid thereon.

14. A cable raceway as recited in claim 9 further comprising a plurality of communication cable collection means spaced from one of said second end of said routing conduits, said cable collection means adapted to collect any excess length of communication cable without loss of operability.

15. A cable raceway as recited in claim 14 wherein said means for collecting any excess of communication cable comprises a take-up spool.

16. A cable raceway for routing and distributing communication cables in a open office environment having a plurality of modular work stations formed from a plurality of partition panels comprising:

a multi-user communication cable interface module having means for coupling said plurality of communication cables;

a plurality of jumper cable means for connecting respectively, each one of said communication cables at said coupling means to a distant communication cable receiving device;

a plurality of horizontal cable channel means mounted atop said plurality of partition panels and spaced from said multi-user communication cable interface module, each of said cable channel means having open ends for receiving and conducting said plurality of jumper cable means therein;

a plurality of cable channel cap means each removably connected to one of said plurality of cable channel means; and a plurality of vertical routing conduit means for dispensing one of said jumper cable means vertically from said cable channel means to said distant communication cable receiving device positioned below said cable channel means, said vertical routing means adapted to route said one of jumper cable means from a horizontal plane to a vertical plane without loss of operability of one of said jumper cable means.

17. In a communication cable management and distribution system for use in conjunction with a modular partition workplace having a plurality of partition panels defining an office work area for a plurality of individual users and having a height less than a ceiling of the office, the workplace is to be connected to a plurality of feeder cables that are connected to the individual users by appropriate jumper cables connected to and extended from a common junction point to individual users, the improvement comprising;

communication module housing unit mountable on top of a partition panel and providing a common junction point for connecting the feeder cables to the jumper cables;

plurality of cable channels that are configured to be mountable atop the plurality of partition panels and connectable to form one or more raceways for receiving the jumper cables and extending from said communication module housing unit;

a plurality of channel caps that are removably mountable on the cable channels to enclose the jumper cables in the raceways as the raceways extend along the top of the partition panels; and a plurality of routing conduits that are removably mountable on vertical sides of the partition panels, each routing conduit carries one or more jumper cables from the raceway on the top of the partition panel to the individual user.

18. The cable management and distribution system of claim 17, wherein the cable channels have an intermediate U-shape configuration and a pair of integral L-shape flanges to provide a universal attachment surface for mounting on a top surface of a partition panel.

19. The cable management and distribution system of claim 18, wherein an upper outer edge of each L-shape flange has a rim for engagement with a corresponding portion of one of said cable channel caps.

20. The cable management and distribution system of claim 17, further including a take-up spool connected to one of said jumper cables exiting from one of said plurality routing conduits.

21. The cable management and distribution system of claim 17, wherein the cable channel caps include snap-out panels and the routing conduits have a complementary surface configuration for mounting in an aperture of a removed snap-out panel.

22. The cable management and distribution system of claim 17, wherein the communication module housing unit has a thickness of approximately the width of the partition panel.

23. The cable management and distribution system of claim 17, wherein the width of the cable channels are less than the width of the partition panels.

24. The cable management and distribution system of claim 17, wherein the cable channel caps can be adjusted to vary their vertical location on the cable channels.

25. In a communication cable management and distribution system for use in conjunction with a modular partition workplace having a plurality of partition panels defining an office work area for a plurality of individual users and having a height less than a ceiling of the office, the workplace is to be connected to a plurality of feeder cables that are connected to the individual users by appropriate jumper cables connected to and extended from a common junction point to individual users, the improvement comprising;

a plurality of cable channels that are configured to be mountable atop the plurality of partition panels and connectable to form one or more raceways for receiving the jumper cables, the width of the cable channels are less than the width of the partition panels;

a plurality of channel caps that are removably mountable on the cable channels to enclose the jumper cables in the raceways as the raceways extend along the top of the partition panels from said common junction point; and a plurality of routing conduits that are removably mountable on vertical sides of the partition panels, each routing conduit carries one or more one of said jumper cables from the raceway on the top of the partition panel to the individual user.

26. The cable management and distribution system of claim 25, wherein the cable channels have an intermediate U-shape configuration and a pair of integral L-shape flanges to provide a universal attachment surface for mounting on a top surface of a partition panel.

27. The cable management and distribution system of claim 26, wherein an upper outer edge of each L-shape flange has a rim for engagement with a corresponding portion of one of said plurality of channel caps.

28. The cable management and distribution system of claim 25, further including a take-up spool connected to one of said jumper cables exiting from one of said plurality of routing conduits.

29. In a communication cable management and distribution system for use in conjunction with a modular partition workplace having a plurality of partition panels defining an office work area for a plurality of individual users and having a height less than a ceiling of the office, the workplace is to be connected to a plurality of feeder cables that are connected to the individual users by appropriate jumper cables connected to and extended from a common junction point to individual users, the improvement comprising;

a communication module housing unit mountable directly on top of a partition panel and providing a common junction point for connecting the feeder cables to the jumper cables;

a raceway, configured to be mountable atop the plurality of partition panels, for receiving the jumper cables and extending from the communication module housing unit; and a plurality of routing conduits that are removably mountable on vertical sides of the partition panels said, each plurality of routing conduits carries one or more one of said jumper cables from the raceway on the top of the partition panel to the individual user.

30. The cable management and distribution system of claim 29, wherein the communication module housing unit has a thickness of approximately the width of the partition panel.

31. The cable management and distribution system of claim 29, further including a take-up spool connected to one of said jumper cables exiting from one of said plurality routing conduits.

32. The cable management and distribution system of claim 29, wherein the raceway conduit includes snap-out panels and the routing conduits have a complementary surface configuration for mounting in an aperture of a removed snap-out panel.

\* \* \* \* \*